UNITED STATES PATENT OFFICE.

GÉZA HARTMANN, OF NEW YORK, N. Y., ASSIGNOR TO HARTMANN ALUMINUM SOLDER COMPANY, OF NEW YORK, N. Y., A CORPORATION OF NEW YORK.

METALLIC ALLOY.

938,422.

No Drawing.

Specification of Letters Patent. Patented Oct. 26, 1909.

Application filed March 5, 1909. Serial No. 481,324.

*To all whom it may concern:*

Be it known that I, GÉZA HARTMANN, a citizen of Austria-Hungary, and a resident of the city, county, and State of New York, have invented certain new and useful Improvements in Metallic Alloys, of which the following is a full, clear, and exact specification.

My invention relates to metallic alloys, particularly such used as solder, its object being to provide a solder for joining together parts of aluminum, and also for joining together aluminum to other metals.

The main object of my invention, however, is the producing of a metallic alloy to serve as solder for joining together pieces of metallic aluminum, both for the purpose of repairing broken structures, or joining together parts of such aluminum structures.

My invention consists particularly of the alloy composed as hereinafter set forth, and of the process of compounding the ingredients of the alloy together.

The metallic alloy which I have devised for these stated purposes is composed of tin, aluminum, nickel and of metallic magnesium, and the best result is obtained when these ingredients are compounded in the following proportions, determined by weight, and bearing in mind that the metals to be used shall be of the quality known in the arts as pure: of tin, eight hundred (800) mills, of aluminum, one hundred and seventy (170) mills, of nickel, seven (7) mills and of metallic magnesium, twenty-three (23) mills.

In preparing the alloy, the aluminum and the magnesium are first fused together in a crucible, care being taken that the mixture should not be heated above the melting point; the nickel is melted in another crucible, and when in this molten condition, is mixed with the fused aluminum and magnesium. During this mixing process, all these ingredients must be kept in freely flowing, molten state, and the molten composition must be agitated and thoroughly mixed. Finally, the tin is also melted, and while in such molten state, is added to the molten mixture of aluminum, magnesium and nickel; after the molten tin is added thereto, the composition must again be agitated and thoroughly mixed. The metallic ingredients of the composition must be melted and treated in clay crucibles, and not in other vessels as sometimes used for preparing metallic alloys. The molten composition is then cast into iron molds and is slowly cooled. The iron molds, into which the composition is cast, should be warmed to about 220° to 250° F. to prevent chilling of the cast, and after the ingots are cooled, they may be cut into suitable lengths and shapes, and are ready for use as solder. The use of this solder does not require any flux. Its melting point is sufficiently low to permit it being applied by an ordinary soldering iron, care must be taken, however, that the soldering iron must be clean and free of any admixture of other metals. The pieces to be soldered together by this alloy must be first thoroughly cleaned, particularly on the surfaces to be joined together. This is best accomplished by heating the parts and brushing the surfaces of the fracture with a steel wire brush. Then, while the parts, to be soldered together, are maintained in heated condition, some of the solder is rubbed upon the surfaces to be joined together, and the brushing with the steel wire brush repeated, so as to spread the solder all over and give the surfaces a smooth appearance. Then the surfaces of the fracture thus treated are set together and brought in such position that the solder melted by the soldering iron, will flow in between them. During this process the parts to be soldered together must be kept heated, and if they be large, it is preferable to use a blow-pipe for that purpose. The solder adheres readily and very strongly and hardens rapidly. Then the edges of the parts thus joined together by the molten solder, are made even, smooth and clean with the soldering iron, and eventually with a file and the steel wire brush.

I have experimented extensively with this alloy, using as solder for structural parts of aluminum, and I have employed it quite extensively for such and other purposes in my practical work. The results of these experiments and practical use of this solder satisfied me that it is highly suitable for such purposes. Fractures or parts of aluminum castings jointed by this solder, made as hereinbefore described, will stand any test that structural aluminum, used in various arts, is required to stand. The solder does not deteriorate, is always ready for use, and is very easily applicable as compared with other alloys which have been heretofore tried for such purposes. Its tensile strength and its capacity to withstand oxidation or deterioration from any cause, is equal to that of aluminum; in fact, in testing such soldered pieces, it almost invariably happened, that the solid metal gave way in some part and the soldered joint could seldom be broken, or torn in such testing.

I claim as my invention:

1. A metallic alloy of tin, aluminum, nickel and metallic magnesium, compounded substantially in the proportions stated.

2. A metallic alloy composed of eight hundred (800) mills of commercially pure tin, one hundred and seventy (170) mills of commercially pure aluminum, seven (7) mills of commercially pure nickel and twenty-three (23) mills of commercially pure metallic magnesium.

3. The process of compounding the hereinbefore described metallic alloy, consisting (1) in fusing together the aluminum and magnesium; (2) melting the nickel in another crucible and adding it to the compound of aluminum and magnesium, while in a molten state, and then agitating and mixing the aluminum, magnesium and nickel together; (3) melting the tin in a sperate crucible and adding it to the compound of aluminum, magnesium and nickel, while both are kept in molten state; and then agitating and mixing them together; (4) casting the molten composition into heated iron molds, and slowly cooling it.

GÉZA HARTMANN.

Witnesses:
M. A. HELMKE,
V. M. BRAUN.